UNITED STATES PATENT OFFICE.

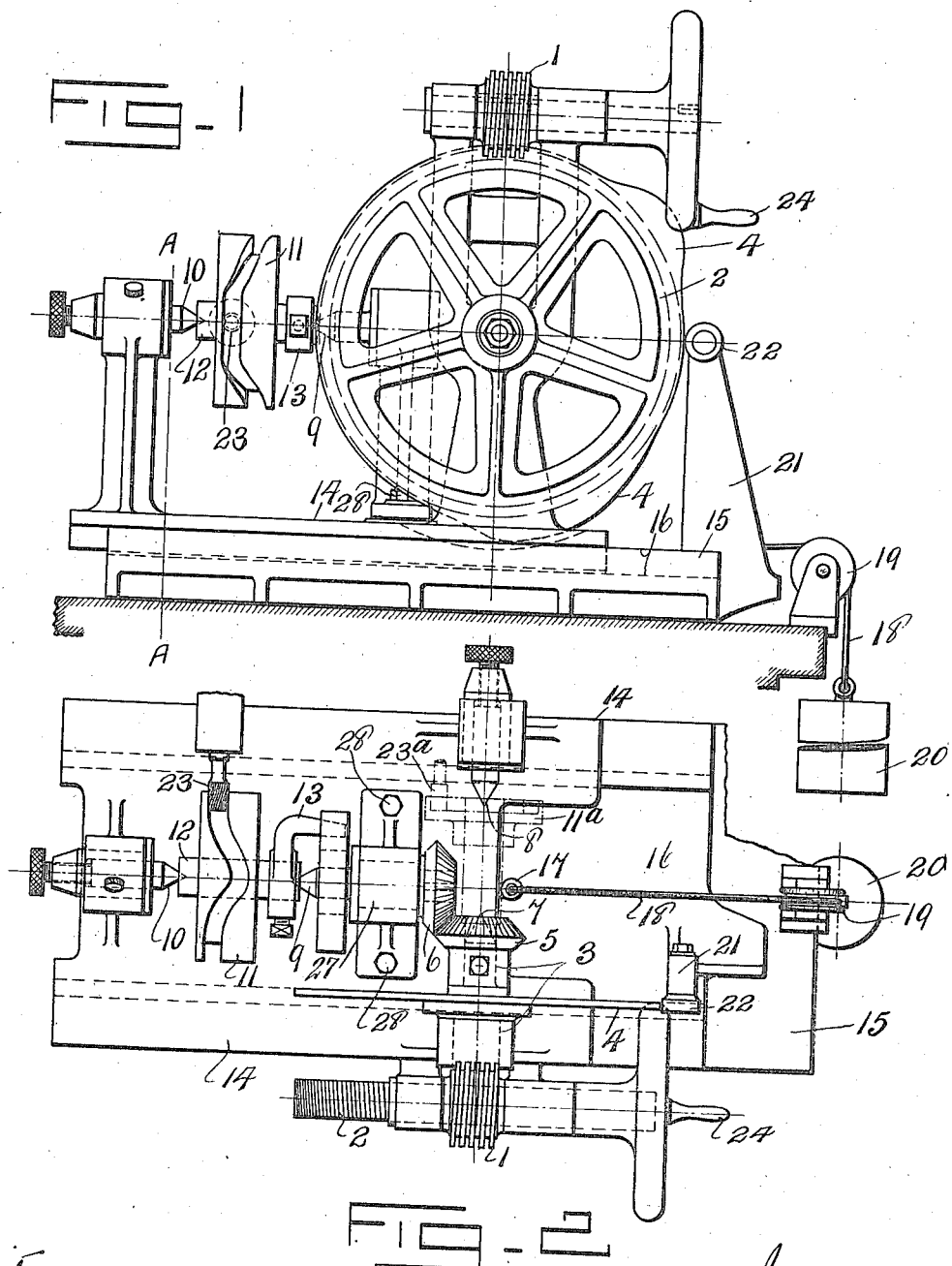

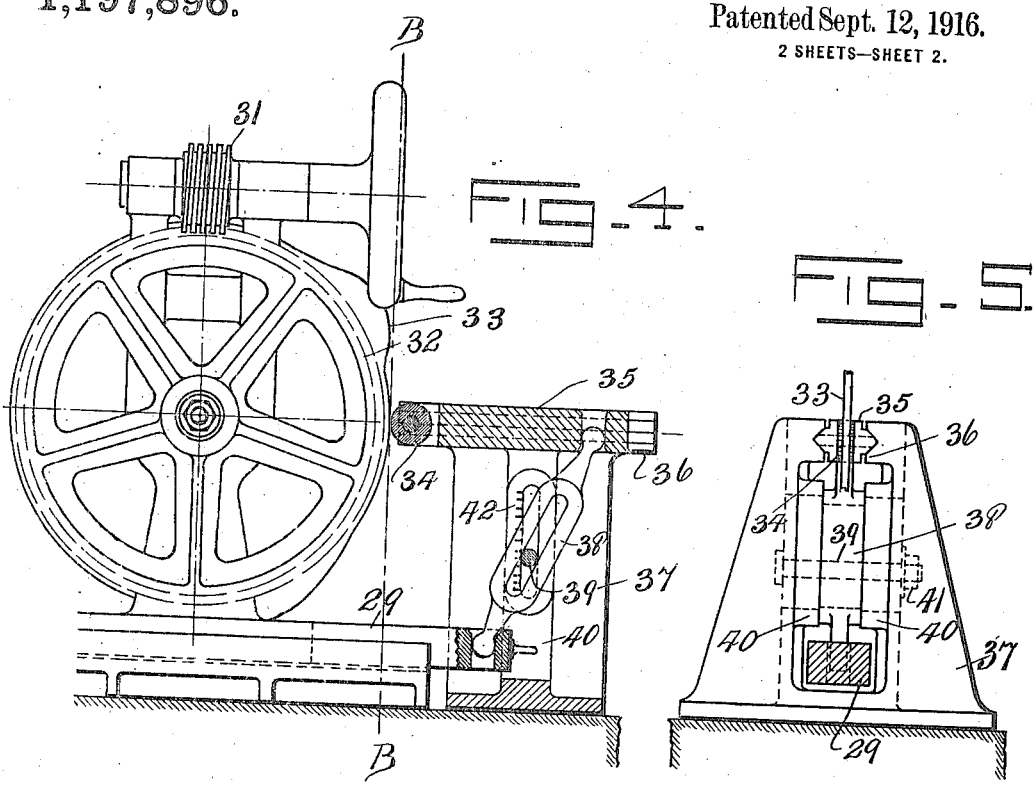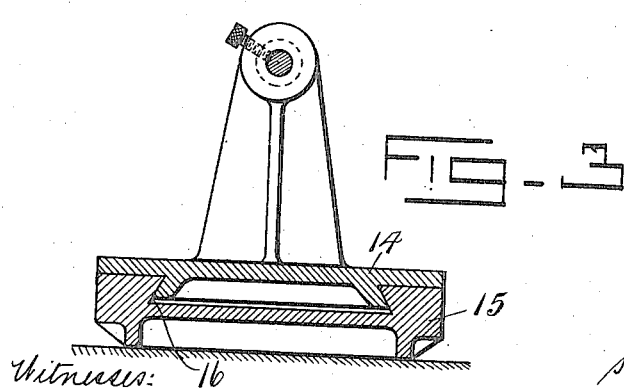

SHANKER ABAJI BHISEY, OF LONDON, ENGLAND, ASSIGNOR TO RATAN TATA, LONDON, ENGLAND.

APPARATUS FOR CUTTING CAMS.

1,197,896.

Specification of Letters Patent.   Patented Sept. 12, 1916.

Application filed February 17, 1915.   Serial No. 8,961.

*To all whom it may concern:*

Be it known that I, SHANKER ABAJI BHISEY, a subject of the King of Great Britain, residing at London, England, have invented certain new and useful Improvements in Apparatus for Cutting Cams, of which the following is a specification, reference being had therein to the accompanying drawing.

This invention relates to improvements in apparatus for cutting cams, and has for its object to provide an attachment for lathes or the like by means of which either edge or face cams can be conveniently and expeditiously cut.

The invention consists broadly in providing a sliding member adapted to carry the blank in which the cam is to be cut and providing means for synchronously rotating the blank and a "former" and providing means whereby the "former" operates in its rotation to cause a change in the position of the blank relative to a rotary cutter or milling tool in conformity with its curvature so that the curvature of the "former" will be accurately reproduced in the cam or cam path being cut.

In the accompanying drawings I have illustrated a machine embodying the essential features of my invention, Figure 1 being an elevational view of the machine. Fig. 2 is a plan view thereof. Fig. 3 is a sectional view on line A—A of Fig. 1. Fig. 4 is an elevational view illustrating a modification of the invention, and Fig. 5 is an elevational view partly in section on line B—B of Fig. 4.

Referring to these drawings and particularly to Figs. 1, 2 and 3 the numeral 1 designates a worm which gears with a worm wheel 2 keyed or otherwise secured upon a shaft 3. Upon this shaft 3 the "former" 4 is also rigidly secured. The shaft 3 also has secured to it a bevel wheel 5 which gears with a bevel wheel 6. Lathe centers 7, 8, 9 and 10 of ordinary form are provided the centers 7 and 8 serving to carry the work when certain face cams are being cut while the centers 9 and 10 serve to carry the work when edge cams are being cut as illustrated in Fig. 2 of the drawings the cam blank 11 being carried upon a mandrel 12 and the work is rotated through the usual carrier 13. The whole of the mechanism hereinbefore described is carried upon a table 14 which is slidably mounted upon a fixed base 15 the table 14 sliding in the dovetail guide 16. The sliding table 14 has attached to it at 17 one end of a flexible cord or chain 18 which passes over a fixed pulley 19 and has attached to its other end a weight 20. Upon a standard or pedestal 21 rising from the fixed base 15 a roller 22 is mounted and this roller 22 coöperates with the edge of the "former" 4 the weight 20 operating to insure contact between the roller 22 and the former 4 under all conditions. The cam cutting tool 23 usually an ordinary milling cutter forms no part of the present invention and may be carried and driven in any suitable known manner.

The operation of the machine is as follows: The cutter 23 is started and entered the required depth into the blank. The worm 1 is then gradually rotated by means, for instance, of the handle 24 and by this means the worm wheel 2, shaft 3 and "former" 4 keyed thereon are all rotated. By reason of the coöperation of the "former" 4 with the roller 22 the sliding table 14 is caused by the weight 20 to move backward and forward according to the curvature of the "former" and thus the cam blank or work 11 is caused to move in relation to the rotary tool or cutter 23 and thus the curvature of the "former" is accurately reproduced and a cam or cam path of the desired curvature results.

The drawings illustrate the cutting of a cam path in the periphery of the work but if it is desired to cut the periphery itself to a given curvature or cut a cam path in a face of the work the work is arranged between the centers 7 and 8 instead of the centers 9 and 10 as indicated by dotted lines in Fig. 2 where the cutter 23ª is seen cutting a cam in the face of the work 11ª.

The machine hereinbefore described will insure cams having the curvature of the "former" but in order to enable cams of any size to be cut from the same "former" with the curvature increased or reduced in exact proportion according to its size I propose to adopt the arrangement shown in Figs. 4 and 5, whereby the movements imparted to the sliding table 29 carrying the work, the worm and worm wheel 31 and 32 respectively and the "former" 33 will be in direct proportion to the size of cam being cut. In order to insure this I provide a roller 34 carried by a member 35 slidably mounted in guides 36 in a supporting standard or frame 37. The sliding member 35 is connected to the sliding work carrying table 29 by means of a slotted link 38 which rocks about an adjustable pin 39. This pin 39 passes through the slotted walls 40 of the standard or frame 37 and through the slot in the link 38 which link is located between the walls 40. By means of the nut 41 this pin 39 can be adjusted in any position along the slotted walls 40 and operating upon the well known principle of a proportional compass it follows that the movements of the table 29 will depend upon the position of the pin 39. Graduation markings as indicated at 42 may be provided to facilitate the adjustment.

It will be seen that by my invention I have provided a means whereby cams can be cut either in the edge, upon the edge, or in the face of the blank from the same sample "former" and moreover it is never necessary to alter the position of the "former" or move the table.

What I claim and desire to secure by Letters Patent is:

Cam cutting apparatus comprising a cutter of fixed location, a work carrying table slidable relative to the cutter, a "former," means for rotating said "former", means for carrying the work between centers with the axis thereof in a plane at right angles to that of the "former", means for causing the work to rotate in a plane at right angles to the "former", and means whereby the "former" in its rotation operates to control the lateral movement of the work relative to the stationary cutter whereby cam grooves can be cut in the periphery of the work.

In testimony whereof I affix my signature in presence of two witnesses.

SHANKER ABAJI BHISEY.

Witnesses:
H. D. JAMESON,
A. NUTTING.